UNITED STATES PATENT OFFICE.

THOMAS M. PRICE, OF WASHINGTON, DISTRICT OF COLUMBIA.

INK.

1,088,840.     Specification of Letters Patent.     Patented Mar. 3, 1914.

No Drawing.     Application filed February 26, 1912. Serial No. 680,029.

*To all whom it may concern:*

Be it known that I, THOMAS M. PRICE, a citizen of the United States, residing at Washington, District of Columbia, have invented certain new and useful Improvements in Ink, of which the following is a specification.

This invention relates to an ink used in transferring and recording finger-prints.

In the methods ordinarily employed in transferring and recording prints of this character, a slab of polished copper or glass is used in connection with a roller, with which a certain quantity of the ink is spread upon the plate or slab, upon which the fingers of the subject are impressed, the fingers retaining a sufficient amount of ink for the transfer. It is with difficulty that just enough ink is placed upon the slab, and where too much or too little is placed thereon, the finger-prints are either too light or too heavy, and consequently, in either event, imperfect. It is usual to apply the ink by depositing a drop or two upon the slab and thereafter thoroughly working it with the roller until a supposedly thin and even layer is spread, but as above suggested, it is difficult to get the proper amount of ink upon the slab or plate in this way.

The object therefore, of this invention, is to provide an ink which is adapted to be made into bricks or pads, of any desired shape and thickness, which will present a surface suitable for contact with the bulbs or ends of the fingers, and one, the consistency of which will not be appreciably susceptible to changes in temperature, ranging say, from 32 degrees to 100 degrees Fahrenheit, or the range in which such ink would be adapted for practical use. This object of the invention last suggested, comprehends a property in the ink of absorbing a certain amount of moisture, to keep the surface of sufficient consistency or hardness to deposit upon the fingers, the desired and required amount of ink.

A further object of the invention is to provide an ink, that, in small quantities or separated from the main bulk or body, will dry quickly, as where just enough ink to make the proper impression is transferred from the fingers to the recording paper.

My invention consists in combining, in proper portions, a suitable coloring material which may be selected from anilin dyes, precipitated carbon, or mineral colors, with fats or oils, fatty acids, or glycerids, preferably a fat solid at 35 degrees C. or 95 degrees F.

In carrying out my invention, I employ lanolin or wool fat, about fifty per cent (50%); glycerin about ten per cent. (10%) and coloring matter about forty per cent. (40%) which proportions, approximately, I have found, when properly and thoroughly mixed together, will form a plastic mass of the proper consistency for the transfer of finger-prints, it being almost impossible to press the fingers so hard upon the substance as to deposit thereon a too great quantity of ink for a proper transfer. The color of ink which is generally employed for this purpose is indelible black, and I may employ where the black ink is required, about forty per cent. (40%) of precipitated carbon in the mass. I have found in practice, that lanolin forms an admirable base for such an ink, but while it has the properties of a binder, and an absorbent of moisture or water, its absorbent properties for my purposes, and also its non-drying properties are not of the best when used alone, but when combined with glycerin in about the proportion named, in the mass, an admirable combined binder and absorbent is produced.

I have found in practice that a mass made of the ingredients in about the proportions I have above stated, produces a non-drying substance, the surface of which will, by reason of the absorbent properties of some of the ingredients, remain in the proper condition of plasticity to enable one to make impressions of fingers on paper or other substances, after first being brought into contact with the mass. It is found that finger-prints so made, are of such clearness and accuracy that they can be readily classified for identification in accordance with the various systems or schemes in which finger-print records are made.

Having thus described my invention, what I claim is:

1. An ink of the character described, comprising a fat solid at 35 degrees C. or 95 degrees F., a coloring matter, and glycerin.

2. An ink of the character described, consisting of lanolin, glycerin, and a coloring matter.

3. An ink of the character described, comprising lanolin 50%, glycerin 10%, and carbon 40%, the whole being worked together in a plastic mass.

4. An ink of the character described, comprising lanolin, glycerin and carbon.

In testimony whereof I affix my signature in presence of two witnesses.

THOMAS M. PRICE.

Witnesses:
 TITIAN W. JOHNSON,
 JAMES L. CRAWFORD.